United States Patent Office 3,407,373
Patented Oct. 22, 1968

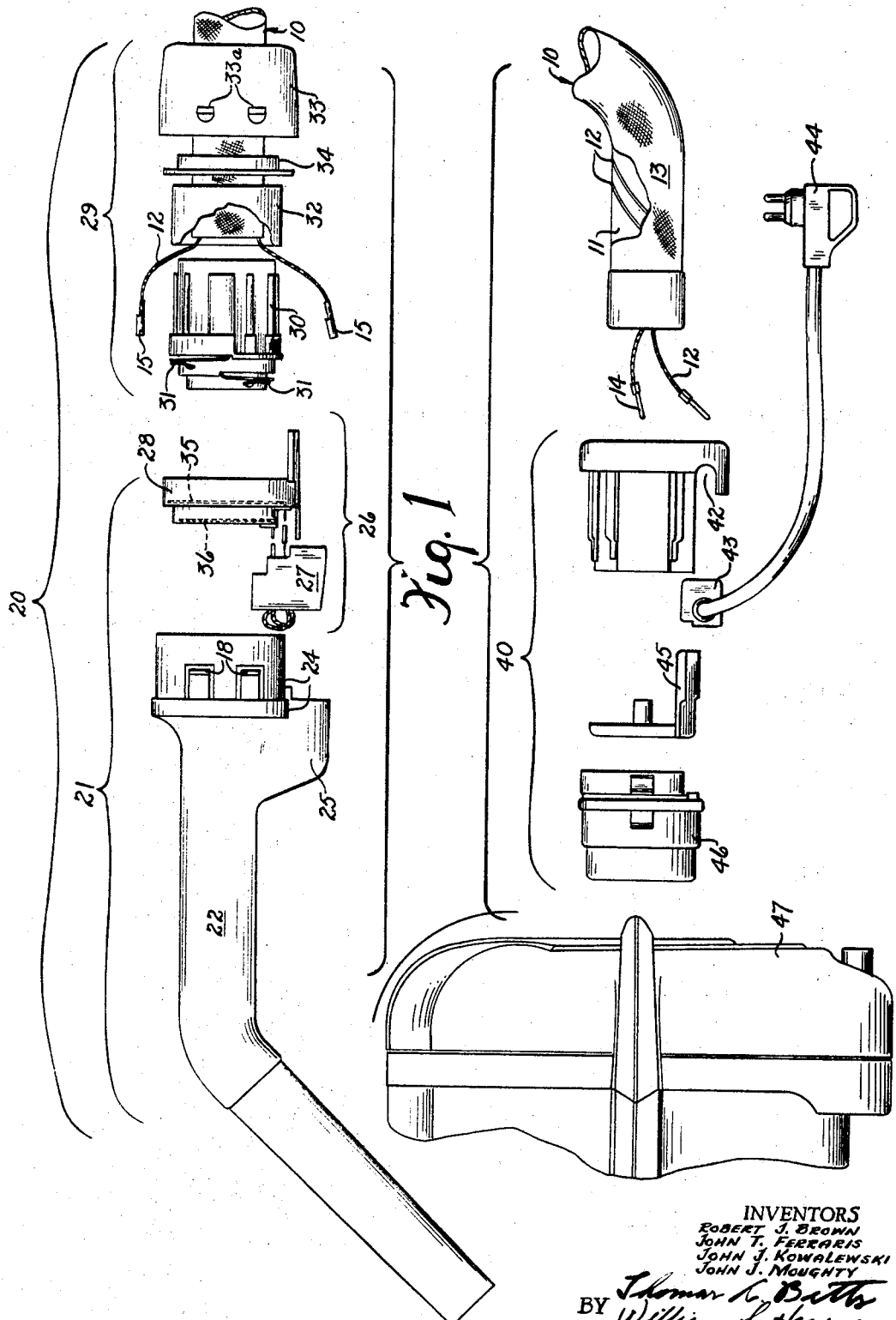

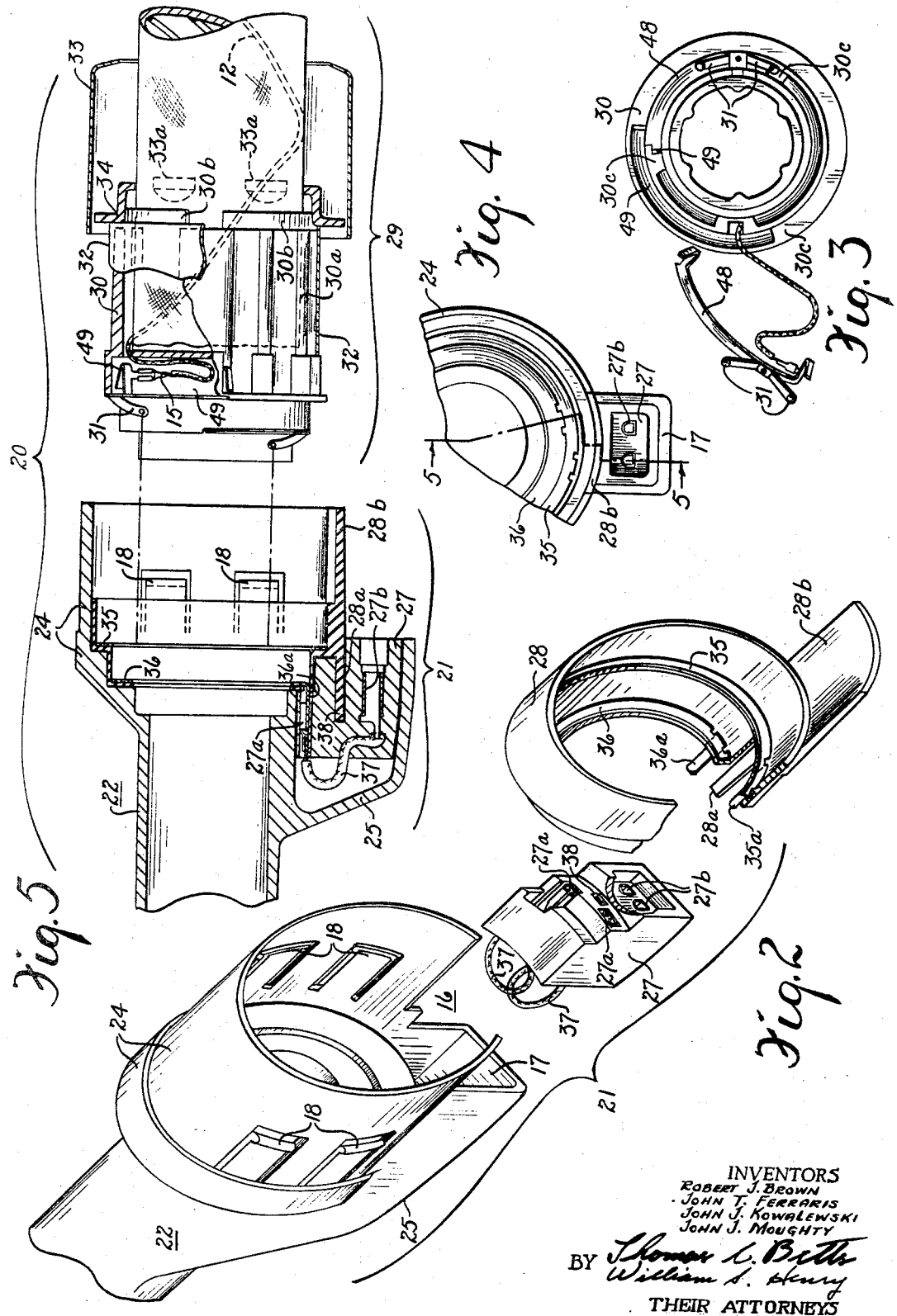

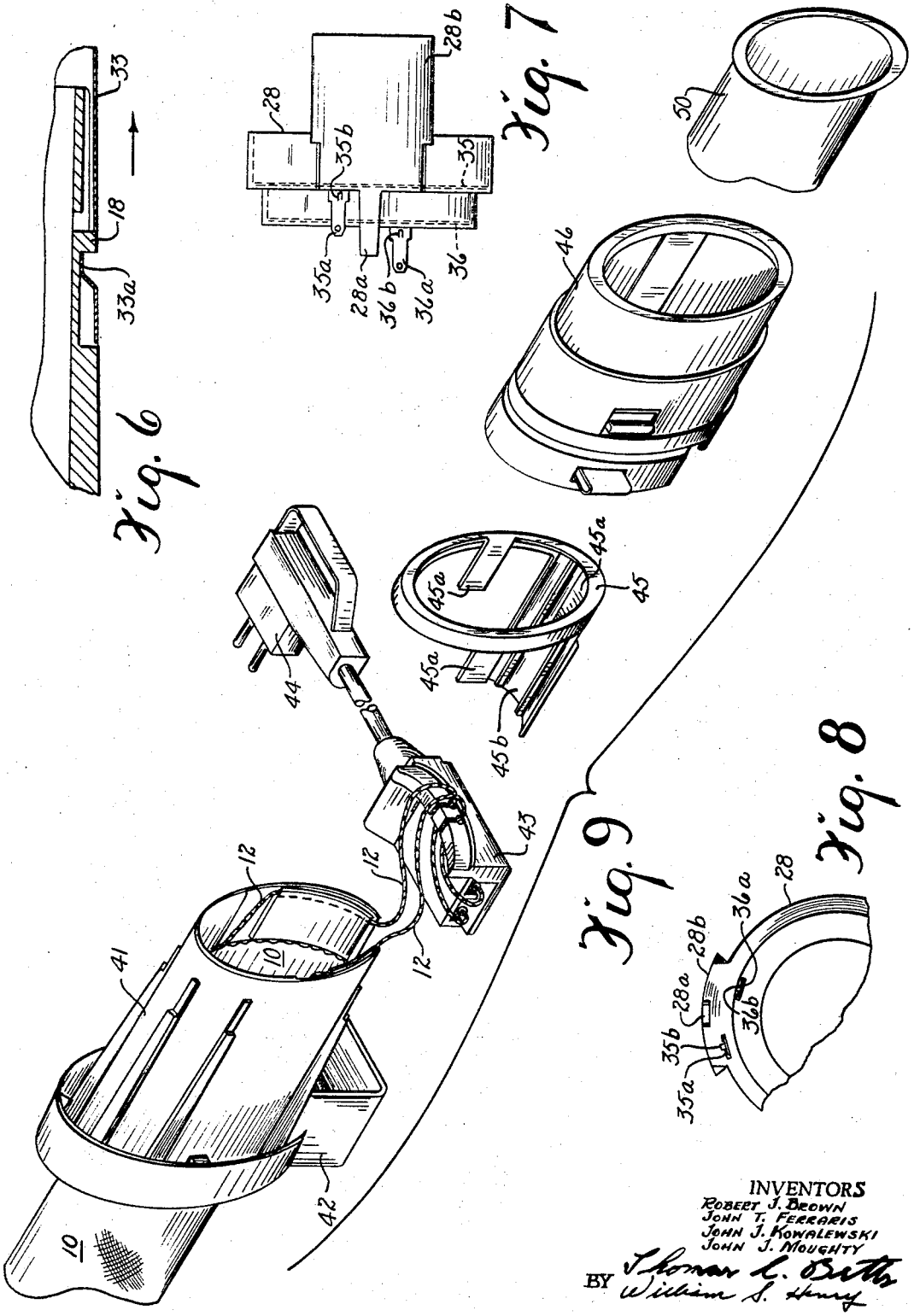

3,407,373
CURRENT CONDUCTING VACUUM CLEANER HOSE WITH IMPROVED END FITTINGS
Robert J. Brown, South Salem, N.Y., and John T. Ferraris, Stamford, John J. Kowalewski, Riverside, and John J. Moughty, Old Greenwich, Conn., assignors to Electrolux Corporation, Old Greenwich, Conn., a corporation of Delaware
Filed Nov. 8, 1966, Ser. No. 592,827
10 Claims. (Cl. 339—5)

ABSTRACT OF THE DISCLOSURE

A suction hose having integral conductors; a bent end tube for vacuum cleaner apparatus, connected to one end of the hose, which is constructed to swivel relative to the hose, and includes a slip ring and contact arrangement for electrically coupling the hose conductors with an electrical outlet associated with the bent end tube, and a push connector for vacuum cleaner apparatus at the other end of the hose which includes an electric plug connector coupled with the hose conductors.

Summary of invention

A vacuum cleaner hose having integral electric conductors requires a fitting at each end, and each fitting must satisfy a dual requirement. That is, one end of the hose must be provided with a fitting, generally referred to as a push connector, for connecting the hose with a vacuum cleaner and also provide an electrical connection between the hose conductors and an outlet on the vacuum cleaner. The other end of the hose must be provided with a fitting, generally referred to as a bent end tube, for connecting the hose with an electrically powered tool and also provide an electrical connection between the tool and the hose conductors.

An additional requirement is that the body of the hose must be allowed to swivel relative to at least one of its fittings without damaging or in any way imparing the continuity of the electric circuit between the hose conductors and the electrical connection carried by the hose fitting.

An object of this invention therefore is to provide a dual purpose fitting for a fluid conducting hose having integral electric conductors.

Another object of this invention is to provide a swivel fitting for a fluid conducting hose having integral electric conductors.

A more particular object of the invention is to provide a suction hose having integral conductors with end fittings suitable for connecting said hose with a vacuum cleaner and associated tools.

The foregoing objects and additional objects and advantages will be apparent from the following description of a presently preferred embodiment of the invention illustrated in the accompanying drawing.

Brief description of drawing

FIG. 1 is an exploded somewhat schematic side elevation of a suction hose having end fittings according to the invention which are particularly adapted for use with vacuum cleaner apparatus.

FIG. 2 is an exploded perspective view of the handle or bent end tube subassembly shown in FIG. 1.

FIG. 3 is an end view of the hose subassembly (partly disassembled) which cooperates with the subassembly shown in FIG. 2.

FIG. 4 is an assembled, partly broken away, end elevation of the subassembly shown in FIG. 2.

FIG. 5 is an exploded cross-sectional view of the handle subassemblies shown in FIGS. 1 and 2; the cross section of subassembly 21 of this figure being taken on line 5—5 of FIG. 4.

FIG. 6 is a partial cross-sectional elevation of the latching arrangement for interconnecting the handle subassemblies shown in FIGS. 2 and 3.

FIG. 7 is a bottom view of the slip ring housing 28 shown in FIGS. 1, 2 and 5.

FIG. 8 is a left side end view of the slip ring housing as shown in FIG. 7 which is partly broken away.

FIG. 9 is an exploded perspective view of the hose assembly at the other end of the hose which is adapted to be connected with a tank type vacuum cleaner as shown in FIG. 1.

Description of preferred embodiment

As shown in FIG. 1 the invention comprises a fluid conducting hose generally designated 10 having a carcass 11 upon which a pair of electric conductors 12 are wrapped. A woven abrasion resistant cover 13 is formed over the conductor wound carcass as is known. A length of each conductor extends beyond each end of the hose, said lengths are stripped if necessary, and fitted with solderless connecting terminals 14 and 15. The hose of the type described briefly above is known from patent application Ser. No. 456,655 filed May 18, 1965, now Patent No. 3,300,571 issued Jan. 24, 1967 and assigned to the assignee hereof.

At one end of the suction hose 10a handle assembly, generally designated 20, is provided which is adapted to be connected with the wand of a power tool (not shown). A power tool of the type referred to is known from U.S. Patent No. 3,266,078 for cleaning rugs or carpets, and like tools. The handle assembly 20 consists of an electric current carrying handle subassembly 21 including a handle 22 which is connected in known manner with the wand of the power tool and having an integral slip ring housing portion 24 and integral receptacle housing portion 25. The handle subassembly 21 also includes a receptacle 27 and a slip ring holder 28. The receptacle 27 fits snugly within the housing portion 25 of the handle 22 and the slip ring holder 28 likewise fits into the housing portion 24 of handle 22 as will appear more clearly hereinafter. The receptacle 27 and slip ring holder 28 are electrically coupled when assembled and also comprises a further subassembly, designated 26. Assembly of the receptacle 27 and slip ring holder 28 is made in a simple and reliable manner to be described in more detail hereinafter.

The handle assembly 20 also comprises a complementary hose and subassembly 29 which includes a ribbed sleeve 30 of insulating material carrying a pair of spring contacts 31 for engaging the slip rings 35 and 36 connected to the holder 28. The subassembly 29 also includes metal reinforcing ring 32 which fits over the ribbed end of the sleeve 30, a bearing ring 34 which fits on the smooth end of the sleeve 30 and an outer shell 33 which holds the assembly 20 in its normal operative position as described in greater detail later herein.

The subassembly 29 concentrically surrounds one end of the hose 10, the terminals 15 being connected with the spring contacts 31 as shown in FIG. 3. As previously noted the subassembly 26 is carried by the handle 22 and the slip ring housing 28 receives the adjacent end of sleeve 30 of the hose subassembly 29 so that the contacts 31 engage the slip rings 35, 36 whereby the hose conductors 12 are coupled electrically with the receptacle 27 while the hose 10, sleeve 30 and parts 32, 34 are allowed to swivel relative to the handle subassembly 21 and shell 33 to eliminate kinking of the hose when it is in use.

It will be apparent from the foregoing that the circuit components of the handle assembly 20 comprise the spring contacts 31 connected to the conductors 12 via the terminals 15, the slip rings 28a, 28b which are engaged by the spring contacts 31 and the receptacle 25 which is connected with the slip rings 35, 36.

The handle assembly 20 is operatively united in a reliable and simple manner by the fingers 18 on the housing portion 24 of the handle 22 which snap into the apertures 33a in the shell 33 as shown in the detail of FIG. 4.

The other end of the hose 10, which is to be connected with a vacuum cleaner by means of a push connector is provided with a fitting, generally designated 40 and herein referred to as a machine assembly. The machine assembly 40 consists of a sleeve 41 of insulating material which is attached over the end of the hose from which the wires 12, having the solderless connectors 14, project. The sleeve 41 has an integral receptacle housing 42 within which is received the receptacle 43 having an associated male plug 44. A wire insulator 45 provides additional insulation between the wire leads 12 and the metallic shell or push connector 46 which is adapted to fit into a conventional inlet of a tank type vacuum cleaner 47 and held against rotation by an anti-swivel device (not shown) which is known.

Details of the subassembly 21 shown in FIG. 1, are illustrated in FIGS. 1, 2 and 5 to which reference is now made. The housing portion 24 of the handle 22 is cut away to provide an opening 16 which is aligned with the compartment 17 formed by the housing portion 25. The receptacle 27, of suitable insulating material, is provided with an opening 38 for receiving the tongue 28a of the slip ring holder 28 (also note FIG. 7) whereby the slip ring receptacle 27 and holder 28 are properly located relative to one another and blades 35a and 36a are aligned with the solderless connectors 27a, 27a of the receptacle 27. The connectors 27a are each attached by crimping to a short piece of conductive wire 37 at one end. The other end of each wire 37 is connected in any suitable known manner with a sleeve 27b which receives the prongs of a male plug, not shown but similar to plug 44 in FIG. 9. When the receptacle 27 and slip ring holder 28 are joined as indicated above, and shown in FIG. 5, the receptacle 27 will fit snugly within the housing portion 24. When assembled the tongue 28b of the holder 28 closes the opening 16. It will be apparent from the foregoing that the slip rings 35 and 36 are electrically connected with the female connectors 27b of receptacle 27 via conductors 37, solderless connectors 27a, 27a and the blades 35a, 36a. The connection just described is shown as subassembly 21 of FIG. 5. It is noted also that the depth of the recess 17 and the dimensions of the receptacle 27 are chosen so that the wires 37 are completely enclosed or segregated from the air passage by the insulating material of the handle 22 as seen in FIG. 5.

Referring now to FIGS. 3 and 5, the insulating sleeve 30 of the subassembly 29, concentrically surrounds the end of the hose 10 and the two conductors 12 are drawn through suitable openings in the sleeve 30 for connection with a pair of spring contacts 31. The spring contacts 31 are mounted on generally arcuate conductive segments 48 which are adapted to snap fit into the arcuate recesses 49 formed in the outer end of the sleeve 30. In FIG. 3 one segment 48 is shown in place in the inner recess 49 and the other segment is shown removed from the recess 49 nearest the periphery of the sleeve 30. The segments 48 are adapted to be bowed for insertion into the respective recesses 49 and when released expand to extend behind the walls 30c of the sleeve 30 at each end of the recesses 49. The recesses 49 are located at different radii from the axis of the sleeve 30 in alignment with the plane of the slip rings 35 and 36 of subassembly 21 in order to place the spring contacts 31 on the slip rings when the subassemblies 21 and 29 are operatively united by shell 33 in cooperation with fingers 18 of subassembly 21 as will be explained in connection with FIG. 6.

A metal ring 32, which fits over the ribs 30a of the sleeve 30, as best shown in subassembly 29 in FIG. 5, is provided for reinforcing the sleeve 30 and also serves to space the bearing ring 34 a small distance from the ends of the ribs 30a. The ribs 30a terminate a short distance from the end of the sleeve 30 leaving a smooth surface 30b on the sleeve 30 for rotatably supporting the bearing ring 34 so that it is free to turn relative to the sleeve 30 which is fixed on the hose 10. Any suitable means may be utilized for fixing the hose 10 to the sleeve 30, for example a thin metal sleeve, such as ferrule 50 of FIG. 9 but not shown in FIG. 5, may be placed within the hose and coextensive with sleeve 30. When such a ferrule is deformed by radial outward expansion thereof the hose is forced against suitable ribbing on the interior bore of the sleeve 30. The shell 33 is supported on the bearing ring 34 at one end as noted above, and the other end of the shell fits over the housing portion 24 of the handle 22. The resilient fingers 18 of handle 22 are depressed by the shell 33 until the apertures 33a formed in the shell register with the fingers. As shown in FIG. 6 the fingers 18 snap into the apertures 33a when the shell is properly positioned on the handle 22 thus locking the parts of assembly 20 in their relative operative positions. As seen in FIG. 6 the shell 33 is depressed adjacent one side of the apertures 33a so that the shell 33 cannot be separated from the handle 22 by a force acting in the direction of the arrow shown in FIG. 4. However, for repairing the hose handle fitting or assembly 20, a tool (not shown) may be clamped onto the shell 33 to depress the fingers 18 inwardly and allow removal of the shell 33 from the handle 22 which exposes the various parts of the assembly 20 to examination and replacement.

Details of the slip ring holder 28 described in connection with FIG. 2, are shown in FIGS 7 and 8. The slip rings 35 and 36 are located within the associated coaxial cylinders forming the holder 28. Each slip ring is backed by a radially inwardly directed wall and is held in place in the holder by tags 35b, 36b (FIG. 7) punched out from the blades 35a, 36a. The tags 35b, 36b catch against the outer surface of the backing walls of the associated slip ring when the blades 35a, 36a are brought through an opening provided for this purpose. Thus the slip rings are quickly and easily attached to the holder 28 and can only be removed by depressing the tags 35b or 36b.

From the above description of the various views of the drawing, it will be apparent that while the shell 33 is fixed on the handle 22 by fingers 18, the hose 10, sleeve 30 etc. are free to pivot while the electric circuit through the handle assembly 20 is maintained, and hose kinking is prevented.

The subassembly 40 at the machine end of the hose, is shown in detail in FIG. 9. The sleeve 41 of insulating material, rigidified by suitable ribbing, fits snugly over the end of the hose 10 from which the wires 12, having the pin terminal 14, project (FIG. 1). The wires 12 are brought out through suitable grooves formed in the sleeve 41, and the pin terminals 14 are inserted, in suitable sockets integral with receptacle 43 for electrically connecting the wires 12 with the prongs of the male plug 44. The receptacle 43 slides into the receptacle housing portion 42 and the exposed lengths of wires 12 are enclosed between a wire cover piece 45, of insulating material. That is, the wires 12 are enclosed between the extensions 45b and the lowermost outer surface of the sleeve 41 and also between the tabs 45a which overlie the wires 12 within the recesses of the sleeve. As a result the cover piece 45 insulates the wires from the metallic push connection shell 46. The shell 46 is attached to the sleeve by means of a press fit or in any other suitable manner.

The hose 10 is held in place relative to the sleeve 41 by means of a ferrule 50 which fits into the hose portion within the sleeve 41. The cylinder 50 is radially outwardly expanded in known manner thus clamping the hose against a serrated inner surface of the sleeve 41.

While we have described a presently preferred embodiment of our invention hereinabove it is to be understood that various modifications and substitutions will be apparent to those skilled in the art and therefore the foregoing is not intended to limit the scope of the following claims.

What is claimed is:

1. The combination comprising a hose having electric conductors integral therewith, and a handle assembly pivotally connected with one end of said hose; said handle assembly comprising, handle means including a pair of slip rings mounted in a slip ring holder of insulating material and an electrical connector device, means for electrically coupling said slip rings and said device, a sleeve consisting of insulating material connected with one end of said hose, said sleeve having a pair of contact means for engaging said slip rings, means for connecting the electric conductors of said hose and said contact means, and means for pivotally connecting said one end of said hose relative to said handle means and maintaining said contact means electrically coupled with said slip rings, the other end of said hose being adapted to be connected to a vacuum means and a source of electrical energy.

2. The combination according to claim 1 wherein said means for pivotally connecting said one end of said hose and said handle means comprises a bearing ring rotatably connected with a discrete portion of said sleeve, said bearing ring having an axially extending flange and a radially extending flange, a shell member, means for connecting said shell member and said handle means, said shell member having an aperture for receiving the axial flange of said bearing ring and abutting against the radial flange of said bearing ring whereby said handle means, said shell member and said bearing ring are pivotal relative to said sleeve connected with said hose.

3. The combination according to claim 2 wherein said handle assembly includes a handle having a slip ring housing portion at one end; said slip ring holder being adapted to fit within said slip ring housing, said slip ring holder comprising a pair of integral coaxial cylinders axially spaced from one another and one of said cylinders having a diameter greater than the other of said cylinders, a slip ring within each of said cylinders; said sleeve having a pair of coaxial ring segments associated with said contact means, said cylinders being adapted to concentrically receive a respective one of said ring segments for connecting said slip rings and said contacts.

4. The combination according to claim 3 wherein said electrical connector device comprises a female receptacle having conductors, said female receptacle comprising a body of insulating material, said body having a first and second arcuate surface conformed to the shape of said cylinders, an aperture in said body communicating with each of said arcuate surfaces, said means for electrically connecting said slip rings and said device comprising a solderless connector in each said apertures, said slip rings having blades extending outwardly from said slip ring holder in a plane parallel with and overlying each said arcuate surface for connection with said solderless connectors, and wire conductors connected with said solderless connectors at one end, the other end of said wire conductors being connected with said female receptacle conductors.

5. The combination according to claim 4 wherein said slip ring holder has a tongue projecting therefrom in an axial plane, and said female receptacle having an aperture for receiving said tongue for locating said receptacle relative to said slip ring holder.

6. The combination according to claim 5 wherein said handle means has a receptacle housing portion communicating with said slip ring housing portion for receiving said female receptable in association with said slip ring holder.

7. The combination according to claim 5 wherein said handle means includes a bent end tube adapted to be connected with a floor cleaning tool for a vacuum cleaner.

8. The combination according to claim 1 with the addition of a subassembly connected with the other end of said hose; said subassembly comprising a second sleeve of insulating material attached to the other end of said hose, said second sleeve having channels therein for receiving said hose conductors, a receptacle housing portion on said second sleeve, a receptacle adapted to fit in the housing portion of said second sleeve; means for connecting said hose conductors and said receptacle, a plug electrically connected with said connecting means in said receptacle, a second shell of metallic material overlying said second sleeve, and means interposed between said shell and said second sleeve for electrically insulating said hose conductors from said second shell.

9. The combination according to claim 8 wherein said second shell comprises a fitting for attaching said other end of said hose to said vacuum means.

10. The combination according to claim 9 wherein said vacuum means comprises a vacuum cleaner having an end cover adapted to receive said second shell; said second shell comprising a push connector.

References Cited

UNITED STATES PATENTS

| 1,925,095 | 9/1933 | Halliburton | 339—8 |
| 2,072,690 | 3/1937 | Smellie | 15—332 |
| 3,127,227 | 3/1964 | Edwards | 339—15 |
| 3,339,168 | 8/1967 | Belicka et al. | 339—5 |

RICHARD E. MOORE, *Primary Examiner.*